United States Patent [19]

Dudley et al.

[11] 4,293,341

[45] Oct. 6, 1981

[54] THIN SECTION INSULATING CONCRETE OF HIGH STRENGTH AND LOW WATER REQUIREMENT

[75] Inventors: Hubert T. Dudley, Chelmsford; Ralph J. Bragg, Townsend, both of Mass.

[73] Assignee: W. R. Grace & Co., Cambridge, Mass.

[21] Appl. No.: 92,157

[22] Filed: Nov. 7, 1979

[51] Int. Cl.³ .............................................. C04B 7/35
[52] U.S. Cl. .................................. 106/88; 106/90; 106/97; 106/98
[58] Field of Search ............................ 106/86–88, 106/90, 97, 98

[56] References Cited

U.S. PATENT DOCUMENTS

| | | | |
|---|---|---|---|
| 2,141,569 | 12/1938 | Tucker et al. | 106/97 |
| 3,257,338 | 6/1966 | Sefton | 106/97 |
| 3,686,133 | 8/1972 | Hattori et al. | 106/90 |
| 3,795,653 | 3/1974 | Aignesberger et al. | 106/97 |
| 3,884,009 | 5/1975 | Frohlich et al. | 52/741 |
| 3,929,650 | 12/1975 | Lange et al. | 106/90 |
| 3,972,723 | 8/1976 | Belle et al. | 106/90 |
| 3,989,534 | 11/1976 | Plunguian et al. | 106/88 |
| 3,997,502 | 12/1976 | Schaupp | 106/90 |
| 4,083,729 | 4/1978 | Yamada et al. | 106/88 |
| 4,126,470 | 11/1978 | Braun et al. | 106/95 |
| 4,131,480 | 12/1978 | McCurrich et al. | 106/97 |
| 4,166,749 | 9/1979 | Sterrett et al. | 106/93 |

OTHER PUBLICATIONS

Hanna, Properties of Expanded Polystyrene Concrete and Applications for Pavement Subbases, R&D Bull. P.C.A., 1978 (pp. 1–16).
Melment, Applications in Concrete, Sternson Ltd., Brantford, Ont.

*Primary Examiner*—James Poer
*Attorney, Agent, or Firm*—C. Edward Parker; William L. Baker

[57] ABSTRACT

Improved lightweight insulating concretes containing expanded vermiculite or perlite aggregate and of the type which are mixed and pumped to roofs of buildings and the like are described. The improved concretes are mixtures in specified proportion of cementitious binder such as Portland cement, expanded vermiculite or perlite, air-entraining agent, polyelectrolytic sulfonate dispersing agent and preferably an inert densifying particulate, which, can be cast as thin cross-section, high strength layers requiring low amounts of "in-place" water, without sacrificing necessary properties such as yield, pumpability, etc. The improved concretes are preferably used as layers over plastic foam insulation boards in the formation of sloped or non-sloped insulated roof systems constructed at the job-site.

14 Claims, No Drawings

THIN SECTION INSULATING CONCRETE OF HIGH STRENGTH AND LOW WATER REQUIREMENT

BACKGROUND OF THE INVENTION

This invention relates to improved lightweight concretes of the type containing a cementitious hydratable binder and low-density particulate expanded vermiculite or perlite aggregate applied as wet layers to roof tops, etc.

Mixtures of hydratable cementitious binders such as Portland cement and expanded vermiculite aggregate are popularly employed in the formation of lightweight, low-density concretes having thermal insulating and fire-resisting properties. Such concretes are ideally suited for use in the construction of thermal insulating roofing system constructed at the job site. When mixed with water, the wet vermiculite-cementitious concrete mixtures can be mixed at ground level and pumped relatively long distances under relative high pressure to the roofs of buildings and the like without undesirable collapse of the porous structure of the expanded vermiculite aggregate or segregation of the components of the wet mixture during mixing and pumping. The inclusion of air-entraining surfactants in the mixes to aid pumpability and lower the density of the hardened product has been long practiced in the art. Expanded vermiculite-Portland cement insulating concretes of this type have been successfully used for some time in combination with lightweight cellular plastic thermal insulating boards, for example, expanded polystyrene boards, to construct exceptionally lightweight, high thermal-insulating, "built-up" roof systems. Examples of such roof systems wherein the concretes are poured in layers contiguous to such plastic insulating boards are shown in U.S. Pat. No. 3,619,961 to Sterrett et al. and U.S. Pat. No. 3,884,009 to Frohlich et al.

Insulating concretes containing porous highly water-absorptive expanded lightweight aggregate must be mixed with relatively large proportions of water in order to provide the wet mixture with sufficient fluidity to be pumped. Whereas typical water to cement ratios for structural Portland cement concretes (containing heavy, non-porous stone and sand aggregate) range between 0.4 to 0.7, a typical water to cement ratio for lightweight expanded vermiculite aggregate-containing concretes (containing the conventional 1 to 6, cement to vermiculite ratio by volume) ranges in excess of 2. The water in such lightweight concrete mixes is greatly in excess of that required to hydrate the cement component and its presence after placement and finishing of the concrete is undesirable. This has led in the past to the limited use of such insulating concretes in built-up roof systems of the aforementioned type over roof decks or roof substrates which had limited means of venting the excess moisture.

Lightweight thermal insulating concretes having relatively low water requirements are known in the art. Concretes based essentially upon mixtures of cement and expanded perlite aggregate (1:3 to 1:4 ratio by volume) and cement and expanded polystyrene beads (1:3 to 1:5 ratio by volume) are known. However, such perlite concretes may be abrasive and difficult to pump. The expanded polystyrene bead concretes tend to plug hoses during pumping, especially if the hose is restricted in any manner and also the expanded beads tend to float to the surface of the concrete. "Pregenerated foam" concretes having relatively low water demand are also known which are prepared by mixing cement with prepared "whipped" foams having the appearance of shaving cream. Such "pregenerated foam" concretes however suffer the disadvantage that the density thereof is very difficult to control.

SUMMARY OF THE INVENTION

The invention is an improved lightweight cement/expanded aggregate insulating concrete composition which can be placed in relatively thin-sectioned layers and which has desired properties such as flexibility, flexural and tensile strength, nail-holding ability, density control, good yield, pumpability, etc. The ability to employ the composition in layers of thin-section having good strength, etc. results in a reduction in the total amount of water placed upon the roof or other substrate. Moreover, the amount of "free" water, that is, water in excess of that necessary to hydrate the cement component is also reduced in the use of the concrete composition of the invention. The inventive concretes are thus ideal for use in roofing systems over substrates characterized in the roofing art as "non-vented".

The inventive concrete composition further shows in particular (a) a faster rate of strength development permitting earlier placement of coverings over the concrete layer; (b) higher density, compressive strength and tensile strength; (c) nail holding power equal to thicker-sectioned layers of a prior composition used in the aforementioned described roofing systems; (d) increased homogeneity, resulting in improvements in pumping, screeding and troweling; (e) high degree of reproducibility of density and strength in field applications; and (f) lower weight per square foot of placement area due to the ability to be cast in thinner section. The inventive concretes having such desired characteristics are obtained herein by combining certain selected components in stated proportions, as hereinafter more particularly defined.

DETAILED DESCRIPTION INCLUDING PREFERRED EMBODIMENTS

The improved lightweight insulating concretes of the invention are prepared from mixtures containing the following:

(a) One part by volume of cementitious binder;

(b) About 2 to about 5 parts by volume of expanded vermiculite or perlite per part by volume of cementitious binder;

(c) About 0.03 to about 0.08 percent by weight of the cememtitious binder of air-entraining surfactants;

(d) About 0.005 to about 0.20 percent by weight of the cementitious binder of polyelectrolytic sulfonate dispensing agent; and (e) Up to about 20 percent by weight of the cementitious binder of an inert densifying ingredient in particulate form.

The above ingredients may be intermixed in any convenient manner following any desired sequence of addition of the individual ingredients. It is preferred to first combine the smaller proportioned ingredients (c) and (d) with the expanded aggregate and optionally the densifying component (e), and thereafter mix the resulting combination with the cementitious (e), and thereafter mix the resulting combination with the cementitious binder (a).

To the dry mixture of (a)–(d) or (a)–(e) above is added sufficient water to hydrate the cementitious binder and to render the wet mixture pumpable and also workable after placement. Amounts of water in excess of that just sufficient to hydrate the cement and render pumpability and workability are to be avoided as such is undesirable on the roof surface. Excessive amounts of mix water can also cause segregation of the components in the mixture which leads to a non-homogeneous product after placement having areas differing in strength. Preferably the amount of water added to the above mixture is from about 90 to about 110, especially about 95 to 105, percent by weight calculated on the total weight of the dry composition.

The cementitious binder component acts to bind the ingredients of the composition together. Any cementitious binder which hardens or sets after mixture with water (hereinafter "cementitious hydratable binder") can be used herein. Portland cement is a preferred such binder for use herein because of its availability, durability and weatherability. Other inorganic hydratable binders known in the art may be used as the binder component as may mixtures of two or more differing hydratable binders. Particularly preferred for use as the binder component herein are those Portland cements designated by ASTM (American Society For Testing and Materials) C150 as Types I or III.

The expanded vermiculite or perlite lightweight aggregate utilized herein has a density less than 10 pounds per cubic foot, preferably in the range of about 5.5 to 8 pounds per cubic foot. The expanded vermiculite or perlite aggregate is employed in the composition to impart lightweight and low density to the hardened concrete. Expanded vermiculite and perlite have several advantages over other lightweight aggregates such as expanded polystyrene particles in low-density insulating concretes. Expanded polystyrene particles tend to float to the surface of cast concrete layers containing such particles. In comparison, expanded vermiculite and perlite do not so float and cast layers containing such can be finished, e.g. "screeded" less problematically. Vermiculite and perlite being of inorganic mineral origin are more fire-resistant than organic plastic foams. Moreover, expanded vermiculite and perlite aggregate offer cost advantages over expanded polystyrene aggregate. Expanded vermiculite is preferred for use in the compositions of this invention. The vermiculite aggregate does not clog pumping equipment and is self-lubricating (non-abrasive to the equipment). Good "yield" is obtained after placement of the composition of the invention containing vermiculite and the placed compositions have good "slip" characteristics, that is, can be easily finished e.g. by screeding. Expanded perlite lightweight aggregate produces less desirable compositions from the standpoint of "yield" and pumping characteristics. The expanded lightweight aggregate component of the composition is preferably present in an amount of from about 3 to about 4 parts by volume per part by volume of the cementitious hydratable binder component.

Any of the commonly used air-entraining surface active agents (surfactants) employed in lightweight cellular concretes can be employed in the compositions herein. These agents act to entrain air in the composition as it is mixed with water and/or pumped. The entrained air not only lowers the density of the hardened placed concrete but also assists pumpability of the wet mixture. The surface active sulfonates have in particular been used by the art for this purpose. Sodium salts of alpha olefin sulfonates as described in U.S. Pat. No. 3,926,650 to Lange et al are preferred as air-entraining surfactants in the compositions of the invention. These surfactants are particularly efficient and are effective at both high and low temperature. Also suitable for such purpose in the present invention are the saponified or neutralized products of Vinsol resin. Vinsol resin is an extract of pinewood and a well known product of commerce. It is believed to be a complex mixture containing high molecular weight phenolic compounds, resin acids, netural material and several minor components. Saponified products of the resin are available commercially under the tradename "Vinsol NVX". The latter product is described in U.S. Pat. No. 3,257,338 to Sefton. Other suitable air-entraining surfactants include "Triton X-100", a non-ionic condensate of octylphenol and ethylene oxide produced by Rohm & Haas Co., and sodium lauryl sulfate or sulfonate. At least sufficient an amount of the surfactant to entrain air and to lower the in-place density of the composition is employed. Overly large amounts of the surfactants can lead to collapse of the placed wet concrete thus increasing density and lowering yield. A preferred proportion of surfactants in the compositions of the invention is from about 0.05 to about 0.07 percent by weight of the cementitious binder.

The polyelectrolytic sulfonate dispersing agent is employed in the inventive compositions to give homogeneity to the concrete mix. The dispersant produces a wet mixture, creamy in nature, with stable suspension properties, resulting in improved pumping characteristics and better screeding and troweling action as compared to compositions not containing such. Also, the dispersant appears to increase density of the product making it possible to reduce the amount of particulate densifying component in the composition of the invention. The polyelectrolytic sulfonate dispersants are salts containing a plurality of sulfo groups. Particularly preferred are dispersing agents which are salts of polymerized alkyl naphthalene sulfonic acids, especially the highly polymerized (high molecular weight) versions thereof. The addition of such salts of polymerized alkyl naphthalene sulfonic acids to Portland cement compositions to act as dispersants, water-reducing agents, "plasticizers", etc. is well known in the art. The preparation of such salts by condensation of an aldehyde such as formaldehyde with naphthalene sulfonic acid followed by neutralization is described for example in U.S. Pat. No. 2,141,569 to Tucker. The preparation and use in Portland cement concrete compositions of the high molecular weight versions of such condensate salts are described in U.S. Pat. No. 3,686,133 to Hattori et al.

Other polyelectrolytic sulfonate dispersing agents useable herein include melamine-formaldehyde condensates containing sulfonic acid groups, and lignosulfonate salts. Sulfonic acid group-containing condensation products of melamine and formaldehyde are commercially marketed under the tradename "Melment". These dispersants and their use in lightweight concretes are described in U.S. Pat. No. 3,795,653 to Aignesberger et al. Salts of lignosulfonic acid such as calcium lignosulfonate have long been used as water-reducing agents "plasticizers" and set-retarding agents in Portland cement compositions. These materials are fully described for example in U.S. Pat. No. 4,169,747 to De Rooy et al. Sufficient polyelectrolytic sulfonate dispersants are included in the compositions of the invention to give the desired homogenity, pumping properties, etc. The upper limit on the amount added appears to be determined by practicality as continued addition of the dispersant beyond a certain proportion does not materially increase the results obtained. The sulfonate polyelectrolyte dispersing agent or mixture of such is preferably included in the inventive compositions in an amount of from about 0.025 to about 1 percent by weight of the cementitious binder.

The inert densifying particulate is preferably employed in the composition of the invention to increase the density of the hardened composition and thus improve its compressive strength. An unexpected result of the use of the densifying aggregate is a distinct and measurable improvement in mix to mix reproducibility. Concrete batches made with the densifier provided the lowest estimated standard deviation in yield, density, and economics. The particulate is inert as regards to the other components of the composition and has a density greater than the lightweight component, preferably greater than about 50 pounds per cubic foot. The particles are smaller than about 0.185inch (4.7 millimeter), that is will pass through a 4 mesh (U.S. screen). Preferably the particles are smaller than about 0.093 inches (2.36 millimeters) and will pass an 8 mesh (U.S. screen). The preferred densifying particulate is natural masonry sand. Also suitable is vermiculite ore concentrate or a manufactured aggregate e.g. crushed stone, gravel or air-cooled iron blast furance slag. The particulate preferably has a bulk density of from about 50 to about 100, typically about 75 to 95, pounds per cubic foot and the following particle size distribution:

| U.S. Screen | Cumulative % Retained by Weight |
| --- | --- |
| 4 | 0 |
| 8 | 0 |
| 16 | Max. 30 |
| 30 | 25–60 |
| 50 | 65–90 |
| 100 | 85–98 |

The inert densifying particulate is preferably employed in an amount of from about 1 to about 20 percent by weight of the cementitious binder.

The invention is further illustrated by the following Examples.

EXAMPLE I

To each 4 cubic foot measurement of expanded vermiculite (ore mined in South Carolina) is added 15 pounds of densifying particulate, 10 grams of the sodim salt of highly polymerized alkyl napthalene sulfonic acid ("Daxad 19", a product of W. R. Grace & Co.) and 25 grams of sodium alpha olefin sulfonate in flake from (90 to 91% active) (Lakeway "301-10F", product of Lakeway Chemical, Inc.). Expanded vermiculite ore mined in Montana can be substituted for the vermiculite component above in which case the amount of densifying particulate added is increased to 17 pounds and the amount of alpha olefin sulfonate salt added is increased to 30 grams. Using a commercial mixer such as the Strong "Deck-Mate", Model D, 95 gallons of water is combined with (a) 24 cubic feet of the vermiculite treated with the aforementioned additives, and (b) 644.4 pounds of Type I Portland cement (ASTM C-150) during a 1.5 minute period while adjusting with water to a consistency of 43 to 47 Vicat, using a conical Vicat weighted at 50 grams. Pumping of the resulting wet mix is accomplished preferably with a positive displacement progressive cavity type pump of 1 to 2 cfm capacity.

EXAMPLE II

A composition of the invention is compared below in Table I with a conventional expanded vermiculite lightweight concrete formulation of the type employed in combination with polystyrene insulation boards in an insulated roofing system as shown in U.S. Pat. No. 3,884,009 to Frohlich et al. The conventional concrete mix contained Portland cement and expanded vermiculite in a 1 to 6 ratio by volume.

TABLE I

| Hardened Concrete, Dry Basis | Conventional Mix | Inventive Mix |
| --- | --- | --- |
| Type I Portland cement | 376 lbs. | 644.4 lbs. |
| Exp. vermiculite | 144 lbs. | 144 lbs. |
| "Lakeway 301-10F" | 0.4 lbs. | 0.33 lbs. |
| "Daxad 19" | none | 0.132 lbs. |
| Densifying particulate | none | 90 lbs. |
| Water of Hydration | 88.36 lbs. | 151.43 lbs. |
| Batch Total | 608.76 lbs. | 1030.39 lbs. |
| Average Dry Density (lbs/ft$^3$) | 25 | 38 |
| Cu. ft./Batch | 24.35 | 27.11 |
| % Yield | 101.46 | 112.96 |
| Lbs. unhydrated cement/ft$^3$ | 15.441 | 23.770 |
| Lbs. Aggregate/ft$^3$ | 5.914 | 5.312 |
| Lbs. Free Water/ft$^3$ | 33.35 | 26.15 |
| Lbs. Free Water/in place thickness | 6.94 (at thickness of 2.5 inches) | 3.27 (at thickness of 1.5 inches) |

Each of the mixes shown in Table I is a typical field batch mixed to the same "Vicat" (to the same fluidity) in order that the batches would pump approximately the same. The inventive mix is "richer", that is, has a 1 to 3.5 ratio by volume of cement to vermiculite and has a higher dry density. The total amount of water (water of hydration plus "free" water) required by the inventive mix is greater, but the more cement-rich inventive mix requires increased water of hydration and leaves less "free" water after placement. The percent yield (obtained by dividing the total batch weight by the density of the pumped mix and thereafter dividing the result by the volume of the aggregate included in the mix) was higher in the case of the inventive mix.

In comparison to the "1 to 6" cement to vermiculite lightweight concretes coventionally employed in combination with foamed plastic insulating boards in insulated roofing systems, the mixes of the invention exhibit higher density, higher compressive strength and higher tensile strength. The inventive mixes are thus able to be cast in thinner-sectioned layers than the coventional mixes without cracking, especially at the joints between foamed plastic boards covered by such layers. The ability to be cast in thinner layers results in less water being placed upon the roof and a layer exhibiting lower weight per square foot of roof area. The compositions of the invention also exhibit faster strength development permitting earlier application of waterproofing membranes thereover. The nail-holding ability (resistance to withdrawal of mechanical fasteners therefrom) of the inventive mixes is equal to thicker-sectioned layers of the conventional mix. Moreover, the inventive mixes appear to possess increased homogeneity, resulting in improvements in pumping, screeding and troweling.

EXAMPLE III

In laboratory experiments, a number of lightweight insulating concrete compositions were prepared, mixed with water, pumped through a hose and cast as wet layers. The hose was fitted with a "pinch valve" to restrict flow therethrough (to create a back-pressure) in an attempt to simulate "field" pumping conditions where the mixes are pumped to the roof tops of buildings. The hose was also fitted with a gauge to measure the back-pressure. Certain properties of the wet mixture were measured. The mixing and pumping equipment used was of the type described in Example I. The compositions are listed in Table II. The wet mix properties of the compositions are listed in Table III. All of the compositions contained 107.4 pounds of type I Portland cement ("Marquette" brand). With the exception of concretes 1 through 4, all mixes were of a "1 to 3.5" design, that is, the ratio by volume of cement to lightweight aggregate was 1 to 3.5. The ratio by volume of cement to lightweight aggregate in mixes 1 to 4 was 1 to 3.41. The air-entraining agent designated "A" in Table II is alpha olefin sulfonate as in Example I. The air-entraining agent designated "B" is "Vinsol NVX" as previously described. The dispersing agent designated "X" in Table II was "Melment F10", a commercial product of Suddeutsche kalkstickstoff-Werke AG, a sodium sulfonate salt of melamineformaldehyde type resin described previously. The dispersant "Y" in Table II is solubilized, desugarized by fermentation, calcium lignosulfonate (50% Aqueous solution), containing no antifoaming agent and obtained from softwood such as spruce and hemlock. The dispersant "Z" is "Daxad 19" as previously described.

In Table III, the measurements taken of the wet mixed and pumped compositions of Table II were as follows; "Lbs.Wat/FBM" is the amount of water in each of the numbered compositions per board foot of mix, that is the amount of water in a one foot by one foot by one inch layer, of poured composition; "% Yield" is that calculated as previously described; "Calculated Dry Density" is obtained by measuring the density of a sample of the wet pumped and placed mix and from that calculating the expected density of the mix after drying and hardening, that is, after loss of the water in excess of that reacted with the cement as "water of hydration", "Hose Back Pressure" is read from the gauge fitted to the hose; and "Pumped Vicat" is a measure of fluidity of the pumped mix obtained by dropping a 50 gram conical weight into a sample of the wet mix from a given height and measuring the distance in millimeters it descends into the sample. The greater the distance, the more "fluid" the wet mix is said to be.

TABLE II

| COMPOSITION NO. | Lightweight Expanded Aggregate | Air-Entrainer Type | Grams | Dispersant Type | Grams | Densifying Particulate (Pounds) |
|---|---|---|---|---|---|---|
| 1 | Vermiculite | A | 25 | X | 9.3 | 15 |
| 2 | Vermiculite | A | 25 | Y | 20.5 | 15 |
| 3 | Vermiculite | A | 30 | X | 10 | 17 |
| 4 | Vermiculite | A | 30 | Y | 20.5 | 17 |
| 5 | Vermiculite | B | 50 | Z | 10 | 15 |
| 6 | Vermiculite | B | 75 | Z | 10 | 15 |
| 7 | Vermiculite | B | 100 | Z | 10 | 15 |
| 8 | Perlite | A | 25 | Z | 10 | 15 |
| 9 | Perlite | A | 25 | Z | 10 | 15 |
| 10 | Vermiculite | A | 25 | Z | 488 | 15 |
| 11 | Vermiculite | A | 25 | Z | 244 | 15 |
| 12 | Vermiculite | A | 25 | Z | 10 | None |
| 13 | Vermiculite | B | 50 | Z | 10 | 15 |
| 14 | Vermiculite | B | 75 | Z | 10 | 15 |
| 15 | Vermiculite | B | 100 | Z | 10 | 15 |
| 16 | Perlite | A | 25 | Z | 10 | 15 |
| 17 | Vermiculite | A | 25 | Z | 10 | 15 |
| 18 | Vermiculite | A | 25 | Z | 10 | 15 |
| 19 | Vermiculite | A | 25 | Z | 488 | 15 |
| 20 | Vermiculite | A | 25 | Z | 10 | None |
| 21 | Vermiculite | A | 25 | X | 10 | 15 |
| 22 | Vermiculite | A | 25 | Y | 20.5 | 15 |
| 23 | Polystyrene beads | A | 25 | Z | 10 | 15 |
| 24 | Vermiculite | A | 25 | Z | 10 | 15 |

TABLE III

| COMPOSITION NO. | Lbs. Water per FBM | % Yield | Calc. Dry Density | Hose Back Pressure | Pumped Vicat |
|---|---|---|---|---|---|
| 1 | 2.75 | 124.69 | 36.07 | 50 PSIG | 44mm |
| 2 | 2.77 | 126.09 | 35.23 | 50 PSIG | 43 mm |
| 3 | 2.64 | 130.06 | 34.99 | 50 PSIG | 42 mm |
| 4 | 2.74 | 127.28 | 35.77 | 50 PSIG | 44 mm |
| 5 | 2.53 | 124.50 | 35.60 | 50 PSIG | 37 mm |
| 6 | 2.53 | 125.34 | 35.27 | 50 PSIG | 39 mm |
| 7 | 2.48 | 131.24 | 33.72 | 50 PSIG | 40 mm |
| 8 | 1.91 | 132.35 | 30.51 | 15 PSIG | 43 mm |
| 9 | 2.25 | 118.32 | 34.49 | 53 PSIG | 42 mm |
| 10 | 2.38 | 126.00 | 35.47 | 50 PSIG | 40 mm |
| 11 | 2.40 | 129.68 | 34.36 | 50 PSIG | 41 mm |
| 12 | 2.50 | 123.82 | 32.73 | 50 PSIG | 39 mm |
| 13 | 2.58 | 122.00 | 36.43 | 80 PSIG | 36 mm |

TABLE III-continued

| COMPOSITION NO. | Lbs. Water per FBM | % Yield | Calc. Dry Density | Hose Back Pressure | Pumped Vicat |
|---|---|---|---|---|---|
| 14 | 2.49 | 125.62 | 35.44 | 70 PSIG | 36 mm |
| 15 | 2.43 | 129.00 | 34.35 | 80 PSIG | 34 mm |
| 16 | 2.34 | 105.00 | 40.19 | 35 PSIG | 45 mm |
| 17 | 2.49 | 126.41 | 34.85 | 80 PSIG | 35 mm |
| 18 | 2.47 | 127.75 | 34.72 | 90 PSIG | 32 mm |
| 19 | 2.32 | 126.00 | 35.43 | 85 PSIG | 36 mm |
| 20 | 2.38 | 126.00 | 32.09 | 80 PSIG | 34 mm |
| 21 | 2.71 | 122.54 | 36.00 | 80 PSIG | 40 mm |
| 22 | 2.79 | 118.40 | 37.15 | 80 PSIG | 41 mm |
| 23 | 1.14 | 133.95 | 28.37 | 42 PSIG | 42 mm |
| 24 | 2.37 | 133.71 | 32.75 | 85 PSIG | 39 mm |

The following comments can be made regarding the laboratory experiments described in Example III (Tables II and III). The hose back-pressures attempted to be created by restricting the hose with a "pinch valve" are considered "low" in the case of Compositions 1-12 (Table III) in the sense that these back pressures are lower than might be expected if the compositions were pumped under actual field conditions to the rooftops of buildings and the like. Compositions 20 and 21 can be considered "control" mixes in the sense of being preferred according to the invention. The data regarding the mixes containing "Melment F10", calcium lignosulfonate and "Vinsol NVX" show these materials to be acceptable substitutes. Compared to the two "control" mixes, mixes containing "Melment F10" appeared to depress "yield" and to increase density. The calcium lignosulfonate dispersant as a 42% total solids addition with "Daxad 19", appeared to have a more pronounced effect on depressing "yield" with corresponding increase in density. "Vinsol NVX" appears to perform as an air-entrainer in a "classical" manner, increasing "yield" as its amount is increased. The substitution of expanded perlite as lightweight aggregate appears to result in a mix which requires less water (about 22%), as compared to the two "controls". The mixes containing the perlite had poor yield and pumping characteristics (compared to the controls). Post-molding shrinkage of all three perlite mixes was severe, and this was confirmed by thickness measurements of cast tensile and flexural strength specimens. The amount of water required by the expanded polystyrene bead-containing composition (No. 23) was reduced 51 percent as compared to the two "controls". The beads had a unit weight of 1.075 lbs/cu. ft. Yield was very high of the polystyrene-containing composition and careful inspection of this composition after pumping revealed no bead attrition or degradation. Pumping properties of the polystyrene-containing mix were extremely poor. Even at the "low" back-pressure of 42 PSIG, intermittent clogging of the "pinch valve" with polystyrene beads was the rule. The polystyrene-containing mix would not pump at higher pressure under the conditions of the experiment, but of course, the experiment does not necessarily indicate the mix would perform the same under actual "field" conditions where no "pinch valve" is used to simulate "field" conditions. High level of "Daxad 19" appeared to reduce water requirements. The compositions containing no densifying particulate (sand) required 5 percent less water and exhibited 7 to 8 percent lower density concrete than the control mixes.

EXAMPLE IV

In order to test the performance of the inventive compositions under actual "field" conditions, in calendar year 1978 the compositions were mixed, pumped and cast as layers acting as components of insulated roofing systems which were applied to roofs of several buildings located in the U.S. and Canada. In such insulated roofing systems, the concrete compositions were applied in layers contiguous to a layer formed by a plurality of expanded polystyrene foam boards in the manner shown in the aforementioned U.S. patent to Frohlich et al. The polystyrene boards had a number of openings therethrough as shown in the Frohlich et al patent. A thin layer of the concrete composition was first applied to the roofing substrate which acted to bond the foamed board layer to the substrate. An additional, thicker layer of the concrete composition was applied over the layer of foamed boards, and finally a conventional waterproofing membrane was applied over this additional thicker layer of concrete. The concrete compositions were prepared in the manner of Example I, that is, all of the components except for the cement and water were first combined and thereafter packaged. The packaged compositions were mixed with water and cement at the job site and pumped to the rooftops of the buildings being roofed. The individual applicators installing the systems utilizing the inventive compositions included several commercial roofing system applicators who agreed to substitute the new inventive compositions for previously purchased insulating concrete composition of the conventional type described above. Each of the applications and information relevant to each such as type of building, location, etc., is given in Table IV.

TABLE VI

1978 Field Applications

| JOB NO. | Date | Type of Building | Location | Roof Substrate | Roof Area(sq.ft) | No. of Concrete Batches | No. of Bags Cement | No. of Bags Remainder | Yield % |
|---|---|---|---|---|---|---|---|---|---|
| 1 | Mar. 29 1978 | Office | Pennsylvania | Existing Roof | 1980 | Unknown | Unknown | Unknown | Not Measurable |
| 2 | June 8 1978 | Warehouse | Canada | Vented steel | 22661 | 176 | 1238 | 1056 | 113.8 |
| 3 | Mar. 30 1978 | Laboratory Shelter | S. Carolina | Existing roof | 1000 | 7 | 48 | 42 | 123.7 |
| 4 | May 1 | Showroom | Florida | Concrete tees | 9600 | 68 | 470 | 408 | 109.1 |

TABLE VI-continued

1978 Field Applications

| JOB NO. | Date | Type of Building | Location | Roof Substrate | Roof Area(sq.ft) | No. of Concrete Batches | No. of Bags Cement | No. of Bags Remainder | Yield % |
|---|---|---|---|---|---|---|---|---|---|
| 5 | June 1978 | School | Florida | Existing Roof | 4455 | Not poured | Not poured | Not poured | Not poured |
| 6 | July 19 1978 | School | New York | Existing roof | 4687 | 39 | 273 | 234 | 111.2 |
| 7 | Sept. 25 1978 | Hospital | Missouri | Monolithic concrete | 6828 | 56 | 392 | 336 | 107.8 |
| 8 | Nov. 9 1978 | Hospital | Pennsylvania | Monolithic concrete | 6172 | 49 | 335 | 294 | 111.7 |
| 9 | Nov. 21 1978 | School | Pennsylvania | Concrete tees | 10080 | 65 | 446 | 390 | 110.4 |

Jobs numbered 1, 3 and 6 in Table IV are of the type referred to in the roofing art as "re-roofing" applications, that is, construction of a new roof system over an existing roof. In these jobs, the existing roofs covered comprised layers of conventional "built-up" roofing (one or more plies of asphaltic sheets adhered together by asphalt) with a top coating of gravel, and thus were "non-vented". In job number 2, the rooftop substrate covered was steel with holes drilled therein to allow escape of moisture. In jobs 4 and 9, the roof substrate covered comprised a number of pre-cast concrete sections having a "T" shape in cross-section. In Jobs 7 and 8, the roof substrates covered comprised concrete decks formed by casting monolithic concrete slabs in place on the job sites.

As can be seen from Table IV, a total of 63,000 square feet of roofdecks were covered and four types of substrates were represented. The mixing, pumping and placement of the inventive concrete compositions was accomplished by individuals who included 5 different commercial firms. Some equipment deficiencies were noted, specifically non-calibrated water meters, but no problems were identified that were not common to the conventional previously-used lightweight insulating concrete compositions. Seven of the jobs shown in Table IV were inspected and sampled in 1979 to determine moisture content, and when possible, compressive strength and density of the concrete. Job number 9 was omitted because it employed a waterproofing membrane that would be difficult to repair if cut into for sampling. Table V indicates the moisture content in the inventive concretes sampled and tested and in the foam polystyrene board immediately below it. Also listed is concrete age at sampling, density, compressive strength, thickness of the core, and "open time" of the concrete, that is, the time interval between pouring of the concrete layer and application of the final waterproofing layer thereover. It was immediately noted in Table IV that the concrete used in Job number 3 is considerably drier than the rest. This is believed due to the comparatively long "open time" of this job and the high ambient temperature and wind conditions prevailing at the time. Also the deck covered in this job had side vents for venting moisture.

TABLE V

| Job No. | Open Time (Days) | Wt. % Moisture at Sampling Age Concrete | Wt. % Moisture at Sampling Age Board | Concrete Age (Mo) | Concrete Cored Samples Thickness | Concrete Cored Samples PCF | Concrete Cored Samples PSI | Initial % Free (Dry Water Basis) |
|---|---|---|---|---|---|---|---|---|
| 1 | 6 | 52.0 | * | 3.0 | 1.28" | 31.0 | 213 | * |
| 1 | 6 | 36.5 | 92.0 | 17.0 | 1.3" | * | * | * |
| 2 | 12 | 30.3 | * | .25 | * | * | * | 64.6 |
| 2 | 12 | 24.4 | 28.6 | 6.0 | * | * | * | 64.6 |
| 3 | 13 | 21.7 | 27.6 | 0.6 | 1.87" | 38.0 | * | 77.0 |
| 3 | 13 | 10.2 | 25.6 | 1.6 | 1.25" | 37.4 | * | 77.0 |
| 3 | 13 | 19.3 | 55.9 | 2.5 | 1.75" | 36.2 | * | 77.0 |
| 3 | 13 | 9.2 | 73.8 | 4.6 | 1.63" | 40.7 | * | 77.0 |
| 3 | 13 | 12.4 | 64.8 | 5.8 | 1.5" | 38.2 | * | 77.0 |
| 3 | 13 | 9.3 | 20.9 | 8.5 | 1.62" | 37.3 | * | 77.0 |
| 3 | 13 | 7.0 | 19.6 | 11.3 | 1.63" | 40.0 | * | 77.0 |
| 3 | 13 | 10.6 | 32.8 | 11.3 | 1.0" | * | * | 77.0 |
| 4 | Unknown | 60.4 | 38.3 | 11.5 | 2.75" | 34.1 | 349 | 68.0 |
| 6 | 4 | 33.1 | 39.3 | 11.0 | 1.89" | 39.8 | 402 | 59.8 |
| 7 | 3 | 37.3 | 12.1 | 9.0 | 2.3" | 37.4 | 381 | 61.2 |
| 8 | 3 | 51.2 | 32.4 | 9.0 | 2.01" | 34.5 | 416 | 67.1 |

*Unobtainable

What we claim is:

1. A hydratable lightweight concrete composition which when pumped and cast as a wet fluid layer hardens into a lightweight, strong porous thermal insulating mass having a density of less than 50 pounds per cubic foot comprising (a) 1 part by volume of hydratable cementitious binder; (b) about 2 to about 5 parts by volume of expanded vermiculite or expanded perlite per part by volume of said binder, said vermiculite or perlite having a density less than 10 pounds per cubic foot; (c) at least about 0.03 to about 0.08 percent by weight of said binder of air-entraining surface active agent; (d) at least about 0.005 to about 0.20 percent by weight of said binder of polyelectrolytic sulfonate dispersing agent; (e) up to about 20 percent by weight of said binder of an inert particulate having a density of from about 50 to about 100 pounds/cu. ft.; and, (f) water in an amount of from about 90 to about 110 percent by weight of the total dry weight of the said components (a) to (e).

2. The composition of claim 1 wherein said expanded aggregate is vermiculite.

3. The composition of claim 1 wherein said air-entraining agent is an alpha olefin sulfonate.

4. The composition of claim 1 wherein said air-entraining agent is a salt of vinsol resin.

5. The composition of claim 1 wherein said dispersing agent is a salt of a condensate of naphthalene sulfonic acid and an aldehyde.

6. The composition of claim 1 wherein said dispersing agent is a sulfonate salt of a condensate of melamine and an aldehyde.

7. The composition of claim 1 wherein said dispersing agent is calcium lignosulfonate.

8. The composition of claim 1 wherein said inert particulate is sand.

9. The composition of claim 1 wherein said binder is Portland cement.

10. A hydratable lightweight concrete composition which when pumped and cast, hardens into a porous thermal insulating mass having a density of less than about 50 pounds per cubic foot comprising (a) 1 part by volume of Portland cement; (b) about 2 to about 5 parts by volume of expanded vermiculite or perlite per part by volume of cement, said vermiculite or perlite having a density less than 10 pounds per cubic ft.; (c) about 0.03 to about 0.08 percent by weight of said cement of alpha-olefin sulfonate air-entraining surface active agent; (d) about 0.005 to about 0.20 percent by weight of said cement of polyelectrolytic sulfonate dispersing agent; (e) about 1 to 20 percent by weight of said cement of inert particulate having a density of from about 50 to about 100 pounds per cubic foot, and (f) water in an amount of from about 90 to 110 percent by weight of the total weight of the said components (a) to (e).

11. The composition of claim 10 wherein said inert particulate has a particle size of less than about 0.185 inch.

12. The method which comprises mixing the composition of claim 1 or claim 9 and thereafter pumping and casting the wet mixture upon a rooftop.

13. The method of claim 12 wherein the wet mixture is cast over a layer of foamed plastic thermal insulation.

14. The method of claim 13 wherein said layer of insulation is comprised of a plurality of polystyrene foam insulation boards.

* * * * *